United States Patent
Howe et al.

[11] Patent Number: 5,823,514
[45] Date of Patent: Oct. 20, 1998

[54] VIBRATION DAMPENING MOUNTING ARRANGEMENT FOR SUPPORTING A COMPONENT ON AN INTERNAL COMBUSTION ENGINE

[75] Inventors: Thomas Howe, Esslingen; Berndt Schütz, Stuttgart, both of Germany

[73] Assignee: Mercedes-Benz AG, Stuttgart, Germany

[21] Appl. No.: 594,626

[22] Filed: Feb. 2, 1996

[30] Foreign Application Priority Data

Feb. 7, 1995 [DE] Germany .......................... 195 03 918.1

[51] Int. Cl.⁶ .............................. F16F 1/36; F02M 35/04
[52] U.S. Cl. .......................... 267/130; 248/634; 248/637; 267/152
[58] Field of Search .................... 267/136, 140, 267/140.4, 140.11, 140.13, 152, 153; 180/300, 312; 248/603, 604, 634, 637, 638; 403/291, 326

[56] References Cited

U.S. PATENT DOCUMENTS

| | | | |
|---|---|---|---|
| 2,030,565 | 2/1936 | Bilde | 248/604 |
| 2,838,262 | 6/1958 | Anderson | 248/603 |
| 3,185,415 | 5/1965 | Thorn | 267/152 |
| 3,268,199 | 8/1966 | Kordyban et al. | 267/152 |
| 3,385,542 | 5/1968 | Enemark et al. | 248/637 |
| 3,476,421 | 11/1969 | Torres | 403/326 |

FOREIGN PATENT DOCUMENTS

| | | |
|---|---|---|
| 580981 | 8/1959 | Canada . |
| 519520 | 2/1931 | Germany . |
| 582 942 | 8/1933 | Germany . |
| 1798 511 | 10/1959 | Germany . |
| 1 807 288 | 1/1960 | Germany . |
| 750962 | 6/1956 | United Kingdom ................... 248/603 |

*Primary Examiner*—Chris Schwartz
*Attorney, Agent, or Firm*—Klaus J. Bach

[57] ABSTRACT

In a vibration dampening support arrangement for supporting a component on a support structure such that it is removable only in a predetermined direction of removal, a projection extends from the support structure at an angle α of 12° to 60° with respect to the direction of removal and an elastic element is disposed on the projection in form-locking engagement with the component in the predetermined direction of removal but is unreleasably held in any other direction.

14 Claims, 7 Drawing Sheets

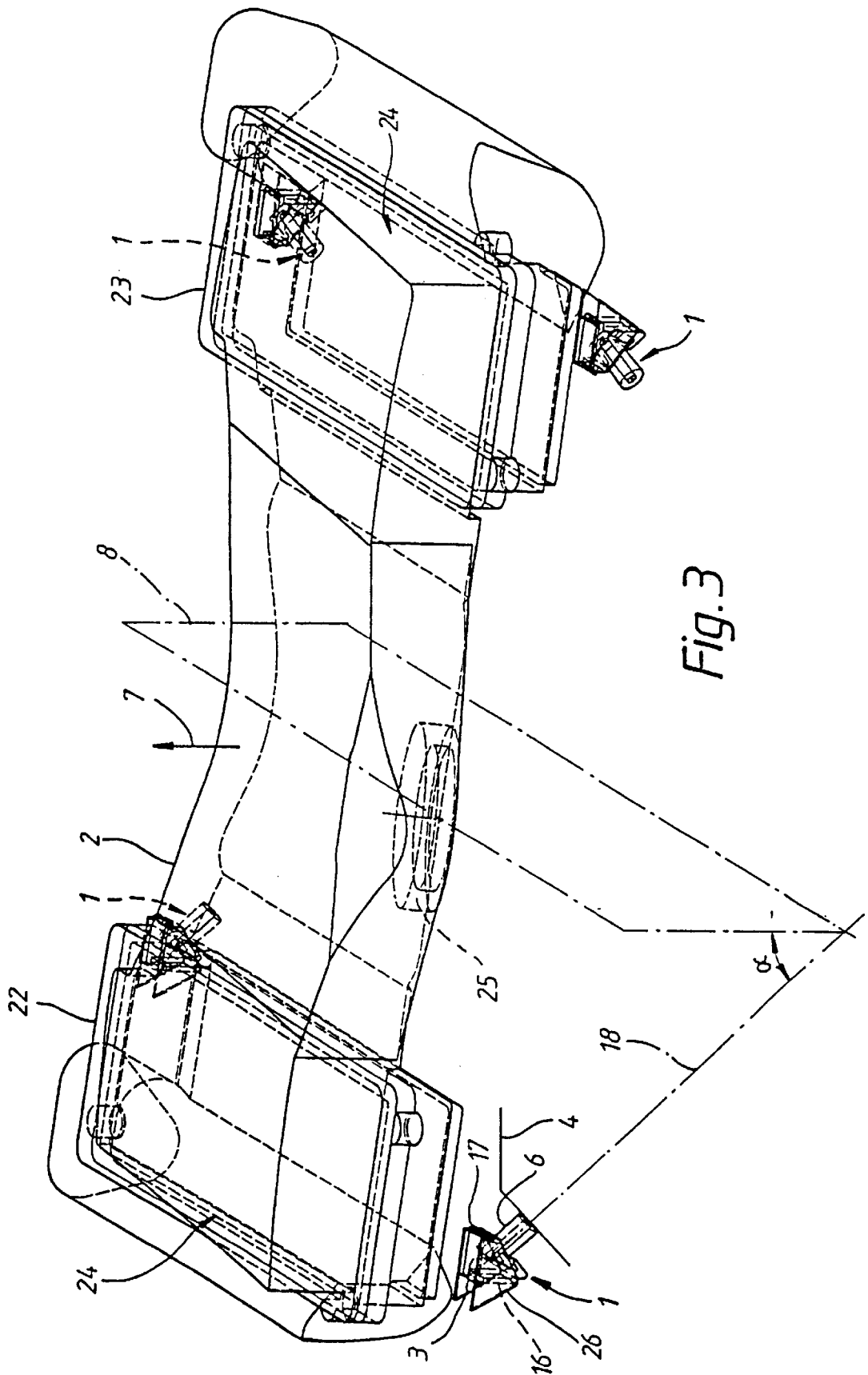

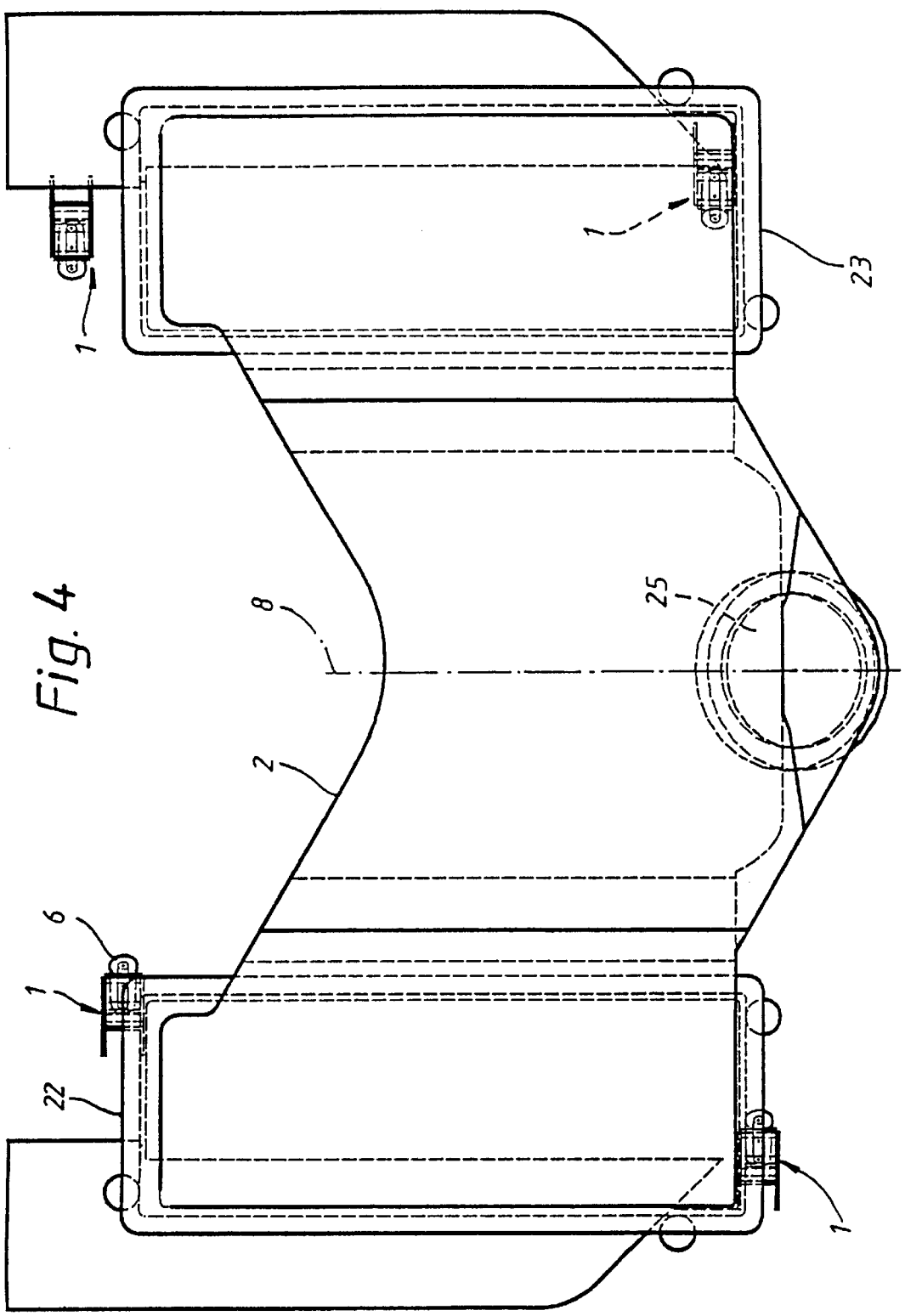

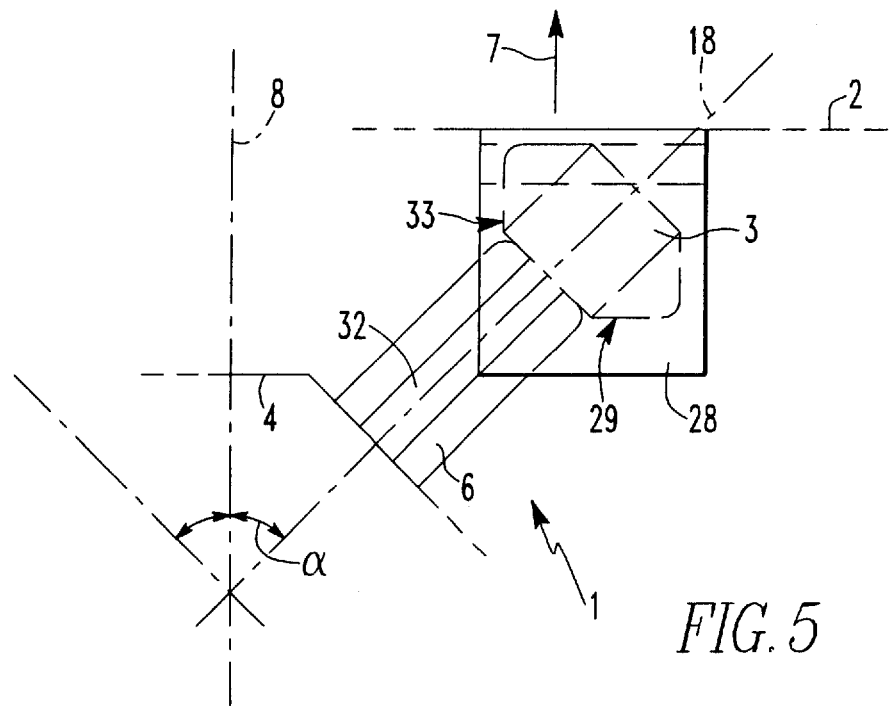
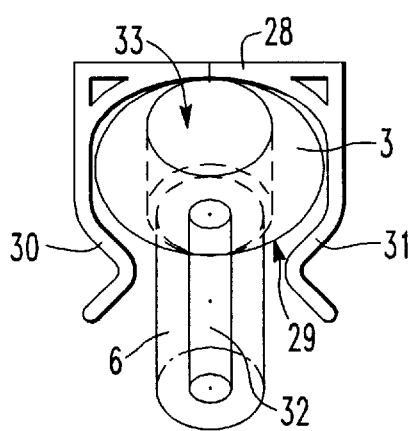
FIG. 6
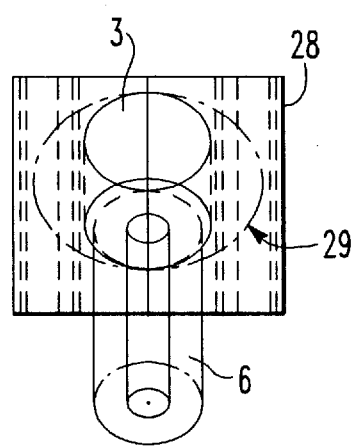
FIG. 7

VIBRATION DAMPENING MOUNTING ARRANGEMENT FOR SUPPORTING A COMPONENT ON AN INTERNAL COMBUSTION ENGINE

BACKGROUND OF THE INVENTION

The invention relates to a vibration dampening mounting arrangement for supporting a component on a support structure, particularly for supporting an air filter on the housing of an internal combustion engine by means of an elastic member which is mounted on an extension of the support structure and which is firmly engaged with the component.

DE PS 582942 discloses such a mounting element for use as a resilient connection between a vehicle body and a vehicle frame which provides for vibration dampening and isolation. The vehicle body has a projection with a ball head which is received in the cavity of an elastic rubber-like element mounted on the frame. The elastic element permits some relative movement between the vehicle body and the frame. At the same time, the elastic element dampens relative vibrations at higher frequencies.

In order to increase the engagement forces of the connection, the pressure of the element on the projection is increased by screwing a bolt into the elastic element. This, however, makes it necessary to enclose the element in a box in order to direct the pressure exerted by the bolt onto the head of the projection. Consequently, this arrangement is relatively expensive and several assembly steps are required to establish a force transmitting connection. Disassembly of the connection is only possible if the pressure of the elastic element on the projection is relieved by unscrewing the bolt.

It is further a disadvantage that the elastic element is locally destroyed when the bolt is screwed into it whereby the life of the elastic element is limited.

It is the object of the present invention to provide a vibration dampening arrangement for mounting a component on a support member, particularly an internal combustion engine, which arrangement provides for good vibration dampening, is simple in design and inexpensive to manufacture.

SUMMARY OF THE INVENTION

In a vibration dampening support arrangement for supporting a component on a support structure such that it is removable only in a predetermined direction of removal, a projection extends from the support structure at an angle α of 12° to 60° with respect to the direction of removal and an elastic element is disposed on the projection in form-locking engagement with the component in the predetermined direction of removal but is unreleasable held in any other direction.

Because of the projections angled arrangement based on the direction in which the mounted component is to be removed, the support arrangement can easily be assembled in the longitudinal direction of the projection. For removal of the mounted component, however, forces are effective at an angle to the longitudinal direction of the projection, that is in the direction of removal, the component is positively locked so that the component is firmly attached to the support member. Positive locking occurs suitably between the elastic element and the projection of the support member. For this purpose, the elastic element includes a cavity into which the projection is inserted in longitudinal direction. The elastic element is placed onto the projection of the support member similar to a plug connection whereby the projection is firmly engaged in the cavity so that the connection between the elastic element and the projection can be released only with a relatively high force. The projection may be cast integrally with the engine block of the internal combustion engine. This has the advantage that, for example, an air filter can be mounted directly on the engine block of the internal combustion engine without the need for any intermediate support structures.

In order to increase the required release force, the projection may be snugly received in the cavity of the elastic element.

It is advantageous to provide at least two elastic elements for the support of the component. The projections received in the respective elastic elements are suitably arranged symmetrically with respect to a center plane extending about normal to the surface of the component to be supported and to which the direction of removal is about parallel. Preferably, the angle between the longitudinal axis of each projection and the center plane is about 20° to 50°, particularly about 45°, so that two opposite projections extend at an angle of about 90° with respect to one another. With the interconnection of two projections with elastic elements disposed thereon, a uniform support is achieved; furthermore, the release force direction is well defined since removal is possible only in the direction normal to the surface of the component to be supported. On the other hand, any movement transverse to the direction of removal is compensated for by the material surrounding the walls defining the cavities in the resilient member so that vibrations, particularly engine vibrations, are reliably dampened. An unintended release of the component is prevented since it is only possible in the predetermined direction of removal.

The elastic member preferably includes, at the side facing the projection, a holding lip which abuts the surface of the projection and firmly engages it. The holding lip is arranged preferably at the side of the projection remote from the center plane so that the holding lip needs to be bent outwardly for the release of the component whereby the projection can slide out of the cavity. On the other hand, for mounting of the component the holding lip is bent inwardly slightly into a recess extending from the cavity so that the force required for the release of the component exceeds the force needed for its mounting.

In accordance with another embodiment of the invention engagement between the elastic member and the projection is achieved by means of a retaining clamp which is connected to the component to be supported and which preferably includes two clamping arms extending into an undercut formed on the elastic member. This embodiment has a large tolerance for the assembly.

In this embodiment, the elastic shaped element is preferably firmly connected to the projection. The elastic element is preferably a composite structure and is formed as a rubber/metal cushion which includes a metal socket with a rubber head disposed thereon. The metal socket may be screwed onto the projection.

The invention will become more readily apparent from the description of some embodiments on the basis of the enclosed drawings.

BRIEF DESCRIPTION OF THE DRAWINGS

FIG. 3 is a perspective view of an air filter with several mounting elements, FIG. 4 is a top view of the air filter, FIG. 5 shows another embodiment for the mounting arrangement, FIG. 6 and FIG. 7 show the mounting arrangement of FIG. 5.

DESCRIPTION OF PREFERRED EMBODIMENTS

Figure 1:
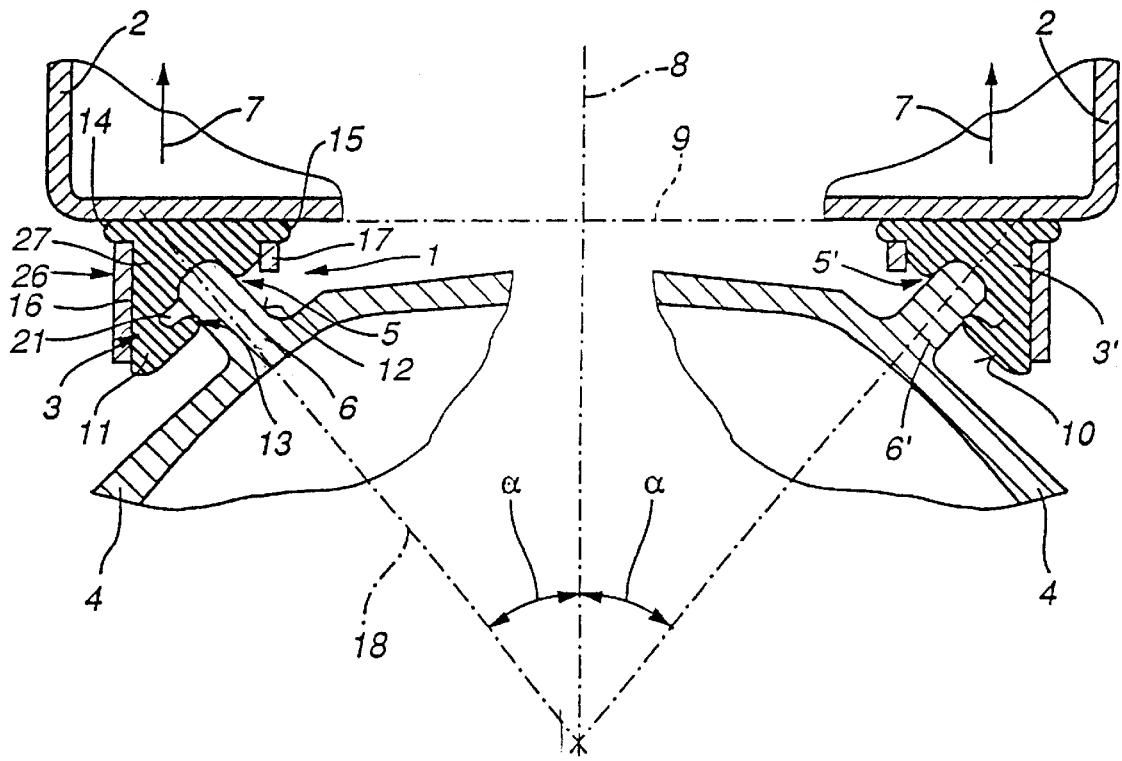
FIG. 1 is a cross-sectional view of the filter housing and the mounting elements for supporting the filter housing on the engine housing.

FIG. 1 shows a mounting element 1 which is firmly connected to a component 2 represented by an air filter and which supports the component 2, that is the air filter, on a support structure 4 which, in the given example, is the housing of an engine block. The mounting element 1 comprises an elastic element with a cavity 5 which receives a projection 6 projecting from the engine housing and being integrally formed therewith. Preferably, the projection 6 is snugly received in the cavity 5 without any play by providing a cavity which has the same but complimentary shape as the projection 6 and giving the projection a slight excess size.

The elastic element 3 is firmly attached to the housing of the air filter 2 by projections 14, 15 which extend from the elastic element adjacent the air filter housing into grooves formed between the surface 9 of the air filter housing and two brackets 16, 17 of a mounting clamp 26. Preferably, the mounting clamp 26 is integrally formed with the air filter housing.

The elastic element 3 may also be mounted to the air filter housing by other suitable connecting means such as cementing, bolting, etc. The connection can be established by material retention, by force locking or by form locking.

The projection 6, which is firmly connected to the engine housing 4, is received in the cavity 5 wherein, in the direction of removal as indicated by arrows 7, there is form locking between the projection 6 received in the cavity 5 and the elastic element 3. In addition to friction locking of the projection 6 with the inner surface of the cavity 5, the projections are also form-locked in the cavities 5 in the direction 7 in which the filter housing is to be removed. To this end, the projection 6 extends at an angle α of preferably about 12° to 60°, especially about 20° to 50°, to the direction 7 at which the air filter 2 must be removed. In the embodiment as shown in FIG. 1, the angle α is about 40°. As further shown in FIG. 1, the longitudinal axis 18 of the projection 6 defines, with the center plane 8 which is normal to the surface 9 of the air filter, an angle α but the direction 7 of air filter removal is parallel to the center plane 8. Because of the angled arrangement of the direction of air filter removal and the projection 6, the cavity 5 includes an end portion 19 (FIG. 2) into which the front end of the projection 6 extends. The end portion 19 extends, at the side of the center plane 8, up to a limit plane 20 which extends parallel to the center plane 8 and through a point of the cavity 5 which is closest to the bottom end of the elastic element. For removal, the air filter is lifted in the direction of the arrows 7 whereby, because of the form lock between the projection and the cavity, the wall areas of the elastic element adjacent the cavity have to be displaced about laterally with regard to the longitudinal axis 18 of the projection 6 which requires a relatively high force.

The air filter 2 is mounted on the engine housing 4 preferably by at least two elastic elements 3, 3' whose cavities 5, 5' receive the projection 6, 6' of the engine housing. The elastic elements 3, 3' are arranged symmetrically with respect to the center plane 8, preferably mirror-symmetrically. Such an arrangement provides for a uniform force distribution to several mounting elements and also defines clearly the direction 7 of removal of the air filter since only movement in a direction normal to the surface 9 of the air filter housing can result in the release of the mounting element. Movement of the air filter in any other direction requires very high forces since each of the projection 6, 6' is pressed, in the elastic members 3, 3', against the side walls of the cavities.

The elastic member 3 has the cross-section of about a right triangle wherein the cavity 5 extends normally from the side 10 forming the hypotenuse of the triangle. By providing different lengths for the shorter side of the right triangle, angles α of different sizes can be formed between the cavity axis that is between the projection and the direction 7 of removal of the air filter. The spatial shape of the elastic element 3 is suitably that of a prism wherein the triangle sides form the base sides of the prism.

Figure 2:
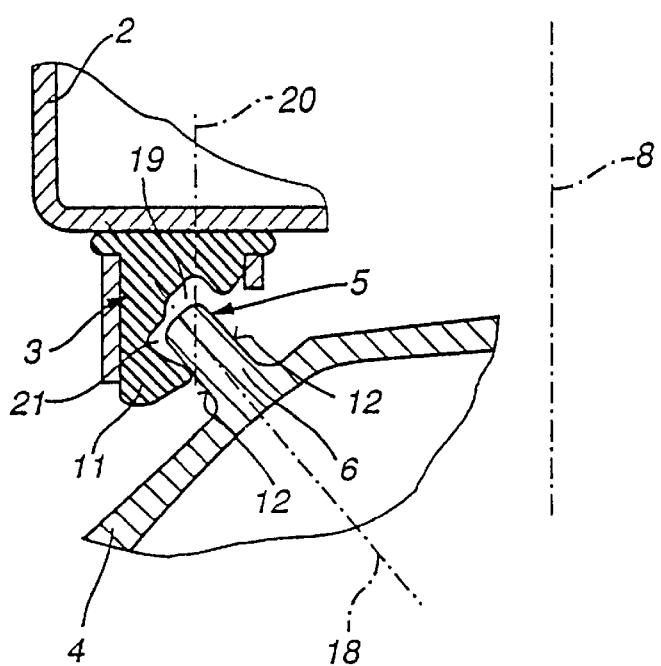
FIG. 2 is a partial view of FIG. 1, showing the elastic element with outwardly bent holding lip.

As shown in FIGS. 1 and 2, the elastic element may be provided with a holding lip 11 extending along the longitudinal side 10 thereof which is adjacent the projection 6 and into which the cavity 5 is formed. The holding lip abuts the surface 12 of the projection 6 extending into the cavity 5 and engages the projection 6 in the cavity 5. Preferably the cavity 5 includes, adjacent the end portion 19, a recess 21 such that the holding lip 11 obtains some mobility in the direction of the longitudinal axis 18 of the projection 6. The recess 21 is arranged between the main body portion 27 of the elastic element 3 and the holding lip 11. The holding lip 11, which is formed integrally with the elastic element 3, extends web-like along the longitudinal side 10 of the elastic element and abuts the surface 12 of the projection preferably with its front face 13. Any axial movement at the projection 6 in the direction of removal of the filter results in a corresponding movement of the holding lip. As indicated in FIG. 2, for removal of the mounting element, the holding lip 11 must be bent outwardly to a substantial degree, whereas mounting of the mounting element requires only relatively little movement of the holding lip into the recess 21. Movement of the holding lip 11 into the recess 21 is limited by the recess depth in the direction of the longitudinal axis 18 of the projection 6. The free end of the holding lip 11, which is hook-like in cross-section, can be bent inwardly into the recess only by the width of the recess. The force required for the removal of the projection, that is the force retaining the projection in the cavity, is therefore substantially greater than the force required for replacing or mounting the air filter. Consequently, assembly of the air filter is easy and fast, but the air filter is firmly held in position and is not unintentionally released.

Preferably, the holding lip 11, is arranged at the side of the projection 6 opposite the center plane 8 so that, for removal of the projection 6 from the cavity 5, the holding lip 11 needs to be bent open because of the form locking between the projection and the cavity.

The projection 6 can be a cylindrical spindle which is cast integrally with the engine housing 4 or it can be screwed into a threaded bore. In a particular embodiment, the projection 6 may be a shaft with rectangular cross-section. In that case, the holding lip 11 abuts the surface of the projection along a contact line extending over the width of the projection. In this arrangement the retaining force for the projection is increased.

The elastic element preferably consists of an elastomer or a rubber-like material which can be made in an inexpensive way for example by continuous extrusion and subsequent cutting to the desired length. Finishing of the projection is not necessary since irregularities on the surfaces of the projections can be accommodated by the resiliency of the elastic element. Roughness of the projection surface will even increase frictional locking between the projection and the elastic element.

FIGS. 3 and 4 give a full representation of an air filter 2. The air filter 2 comprises two oppositely disposed suction boxes 22 and 23 each of which receives a filter element 24 for filtering the intake air. The clean air is supplied to the engine intake manifold (not shown) by way of a central outlet 25. At the side of the air filter adjacent the engine casing 4, each suction box 22, 23 has two mounting elements 1 by which the air filter is mounted to the engine housing. The mounting elements each comprise the mounting clamp 26, which is firmly attached to the air filter and which firmly engages elastic element 3. The mounting clamps 26 each include the brackets 16 and 17 which engage the side projections of the elastic element 3. The cavities in the elastic elements receive the projection 6 which are part of the engine housing 4 and whose longitudinal axes 18 define an angle α with the center plane 8 extending transversely through the air filter 2.

As shown specifically in the top view of FIG. 4, with respect to the center plane 8, the diametrically opposite mounting elements can be arranged at different distances from the centerplane and they may also be sidewardly displaced. However, the longitudinal axes 18 of all the projections 6 are arranged at an angle with respect to the center plane 8 so that an increased force is necessary for the removal of the air filter 2 from the engine housing 4 in the direction of the arrow 7 in order to release the engagement between the projections 6 and the elastic elements 3. It may be suitable to arrange the mounting elements on each one of the suction boxes with their cavities directed inwardly at such an angle that the longitudinal axes of the projections intersect in the center plane 8 at a right angle with respect to one another.

By altogether four mounting elements as shown in FIGS. 3 and 4, the weight of the air filter is evenly distributed onto the engine housing. Furthermore, vibrations such as engine vibrations are effectively dampened by the arrangement while only little space is required for the mounting elements.

FIGS. 5 to 10 show another embodiment of the mounting element. The projection 6 extends from the engine housing, that is from the engine block 4, preferably in the form of a cylindrical pin integrally cast with the engine block. At its free end, the projection 6 carries the elastic element 3 which is received in a retaining clamp 28 in a form-locking fashion. The retaining clamp 28 is preferably firmly attached to the air filter 2 which can be removed from the engine block 4 in the direction of the arrow 7. The longitudinal axis 18 of the projection 6, which defines the mounting direction for installing the elastic element 3 into the retaining clamp 28, extends at an angle α with respect to the center plane 8. The center plane 8, to which the direction 7 of removal of the air filter 2 is parallel, forms the plane of symmetry for two mirror-symmetrically arranged mounting elements 1. In the embodiment shown, the angle α is almost 45°.

Firm locking engagement between the elastic element 13 and the retaining clamp 28 is achieved by two opposite clamp bracket portions 30, 31 which extend over a back taper area formed on the elastic element (see FIGS. 5 to 7). The elastic element 3 is a rubber-metal composite damping element and comprises a metal socket 32 and a rubber head 33 firmly connected to the metal socket 32. The rubber head 33 has a circular cross-section and, preferably has the shape of a disc wherein, as shown in FIG. 5, the circumferential edge of the disc-shaped rubber head 3 has an approximately triangular cross-section. The metal socket 32 of the elastic member 3 is screwed onto the projection 6 whereby the elastic member 3 is firmly attached to the projection 6. Preferably, the projection 6 has a bore which is internally threaded and the metal socket 32 has the form of a bolt which his screwed into the internal thread of the projection 6.

The rubber head 33 of the elastic member 3 has a larger diameter than the projection 6, whereby the back-taper area 29 receiving the retaining clamps 28 for form locking engagement with the rubber head, is naturally formed at the end of the rubber head toward the engine block. In accordance with FIG. 6, the bracket portions 30, 31 of the retaining clamp 28 have end sections which are bent inwardly and again outwardly in the form of a "V" and extend into the backtaper area 29 of the rubber head 33.

In another embodiment, the rubber head of the elastic member has an oval cross-section.

It can be seen from FIG. 7 that the retaining clamp 28, which is shown in FIG. 7 in a top view, has an approximately square cross-section.

Figure 8:
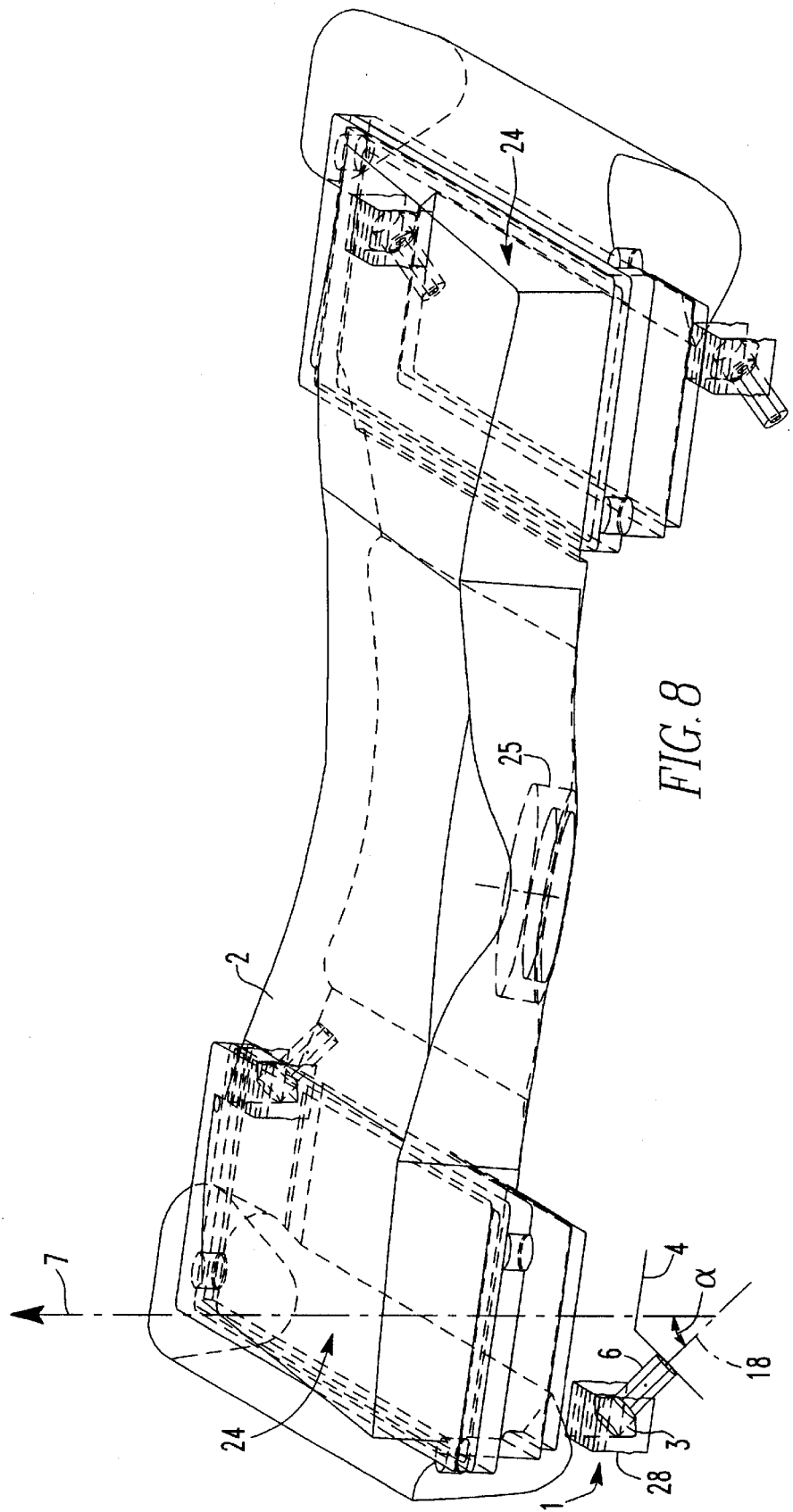
FIG. 8 is a perspective view of an air filter with several mounting elements as shown in FIG. 5.
Figure 9:
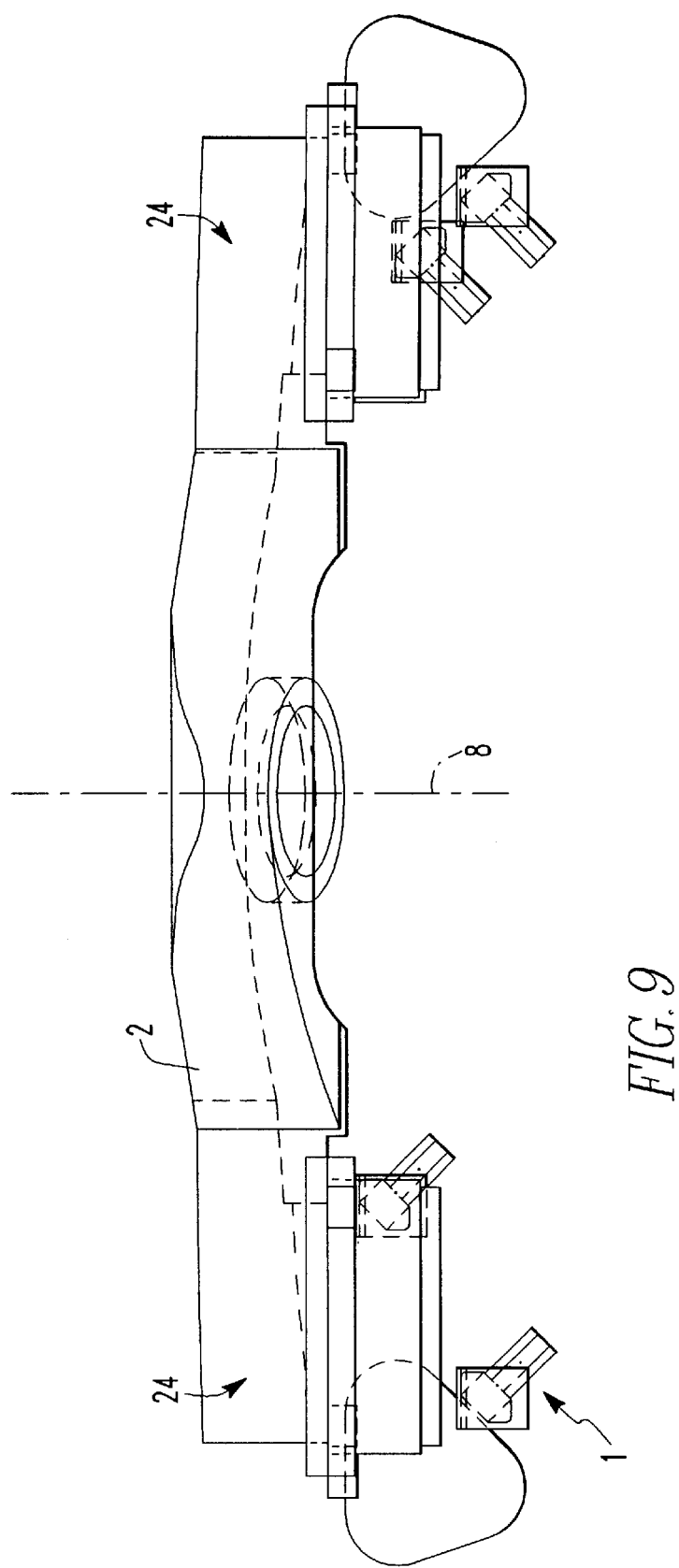
FIG. 9 is a side view of the air filter shown in FIG. 8.
Figure 10:
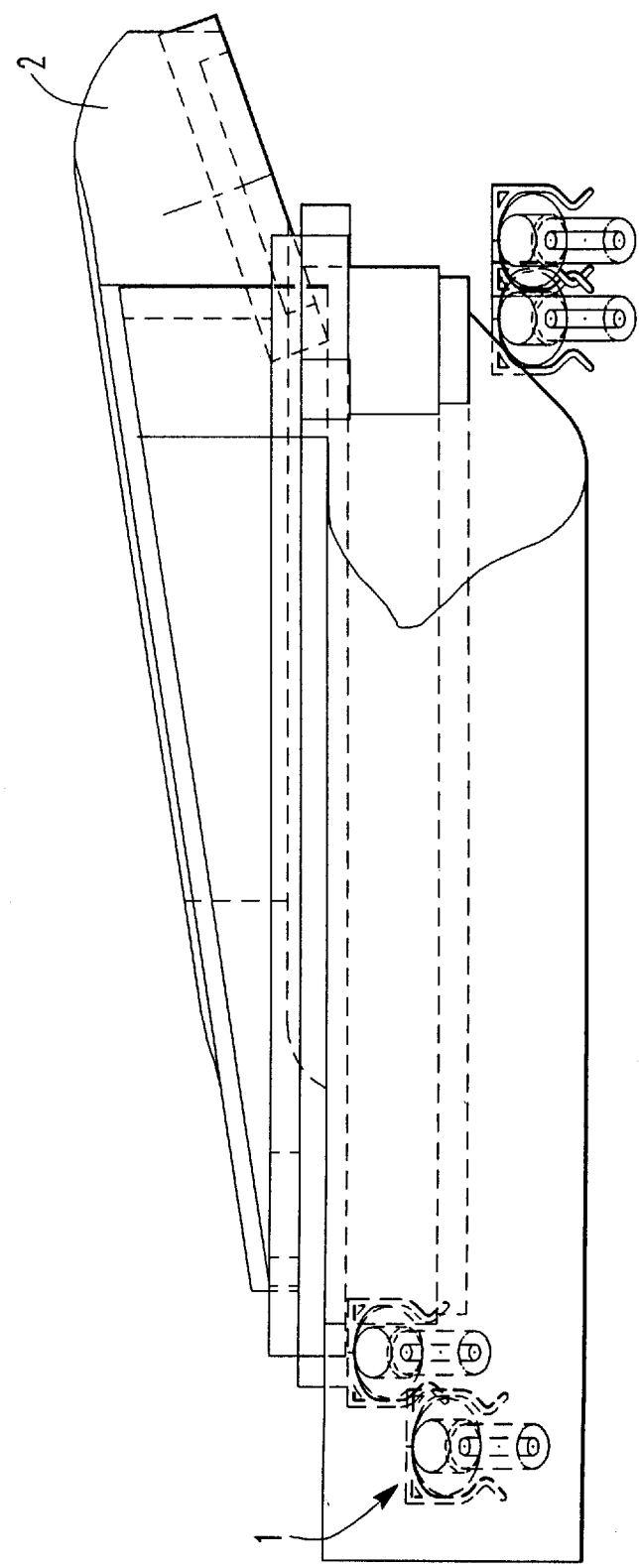
FIG. 10 is another side view of the air filter shown in FIG. 8.

FIGS. 8 to 10 each show the air filter 2 including the mounting elements 1. The surrounding air is sucked in through the two filter elements 24 arranged at the opposite sides. The air is cleaned and then supplied to the engine intake manifold by way of the outlet 25. In the corner areas, the air filter 2 carries the mounting elements 1 by which the air filter 2 is mounted on the engine block 4. The longitudinal axes 18 of the projections 6 define an angle α with the direction of removal 7 of the air filter; but the four projection may be arranged at different angles with respect to the direction of removal of the air filter. As shown in FIG. 9, the mounting elements 1 arranged on opposite sides of a filter element 24 may have different distances from the center plane 8. It can further be seen from FIG. 9 and from FIG. 10 that the mounting elements may be arranged at different height levels.

What is claimed is:

1. A vibration dampening support arrangement for a component on a support structure whereby said component is removable in a predetermined direction of removal, said support structure having a projection extending therefrom, and said component including an elastic element having a shape, in cross-section, of a right triangle, and having a cavity which extends from the longer side of said triangle and receives said projection such that said component is in form-locking engagement with said support structure in said predetermined direction of removal, said projection extending with respect to said predetermined direction of removal at an angle α of about 12° to 60°.

2. An arrangement according to claim 1, wherein said elastic element includes, at the side adjacent said support-structure, a holding lip which abuts the surface of the projection received in said cavity and which firmly engages said projection in said cavity.

3. An arrangement according to claim 2, wherein said holding lip is arranged at the side of the projection remote from a center plane of said component, said center plane extending about normal to a lateral surface of the component to be supported.

4. An arrangement according to claim 3, wherein said elastic element includes a recess arranged in communication with said cavity and extending inwardly from said holding lip adjacent said projection.

5. An arrangement according to claim 2, wherein said holding lip has the shape of a web having a front face area which abuts the surface of said projection.

6. An arrangement according to claim 1, wherein said component to be supported includes a retaining clamp by which said elastic element is firmly engaged in a form locking manner.

7. An arrangement according to claim 1, wherein said projection has the form of a cylindrical pin cast integrally with said component.

8. An arrangement according to claim 1, wherein said angle $\alpha$ between said projection and said predetermined direction of removal is between 20° and 50°.

9. An arrangement according to claim 1, wherein said projection is engaged in said cavity without any play.

10. A vibration dampening support arrangement for a component on a support structure whereby said component is removable in a predetermined direction of removal, said support structure having at least two projections extending, with respect to a center plane which is disposed between said at least two projections and oriented in the direction of removal of said component, symmetrically and at an angle $\alpha$ of 12° to 60° with respect to said center plane, and said component including spaced elastic elements having cavities receiving said projections and having holding lips which abut the surfaces of said projections received in said cavities and retain said projections in said cavities, but release said projections if an appropriate force is applied.

11. An arrangement according to claim 10, wherein said holding lip has the shape of a web having a front face area which abuts the surface of said projection.

12. An arrangement according to claim 11, wherein said holding lip is arranged at the side of the projection remote from a center plane of said component, said center plane extending about normal to a lateral surface of the component to be supported.

13. An arrangement according to claim 10, wherein said elastic element includes a recess arranged in communication with said cavity and extending inwardly from said holding lip adjacent said projection.

14. An arrangement according to claim 10, wherein said at least two projections have longitudinal axes extending at an angle of about 90° with respect to each other.

* * * * *